April 7, 1942.  L. S. HAMER  2,278,848
LINE BLIND
Filed Dec. 20, 1939  2 Sheets-Sheet 1
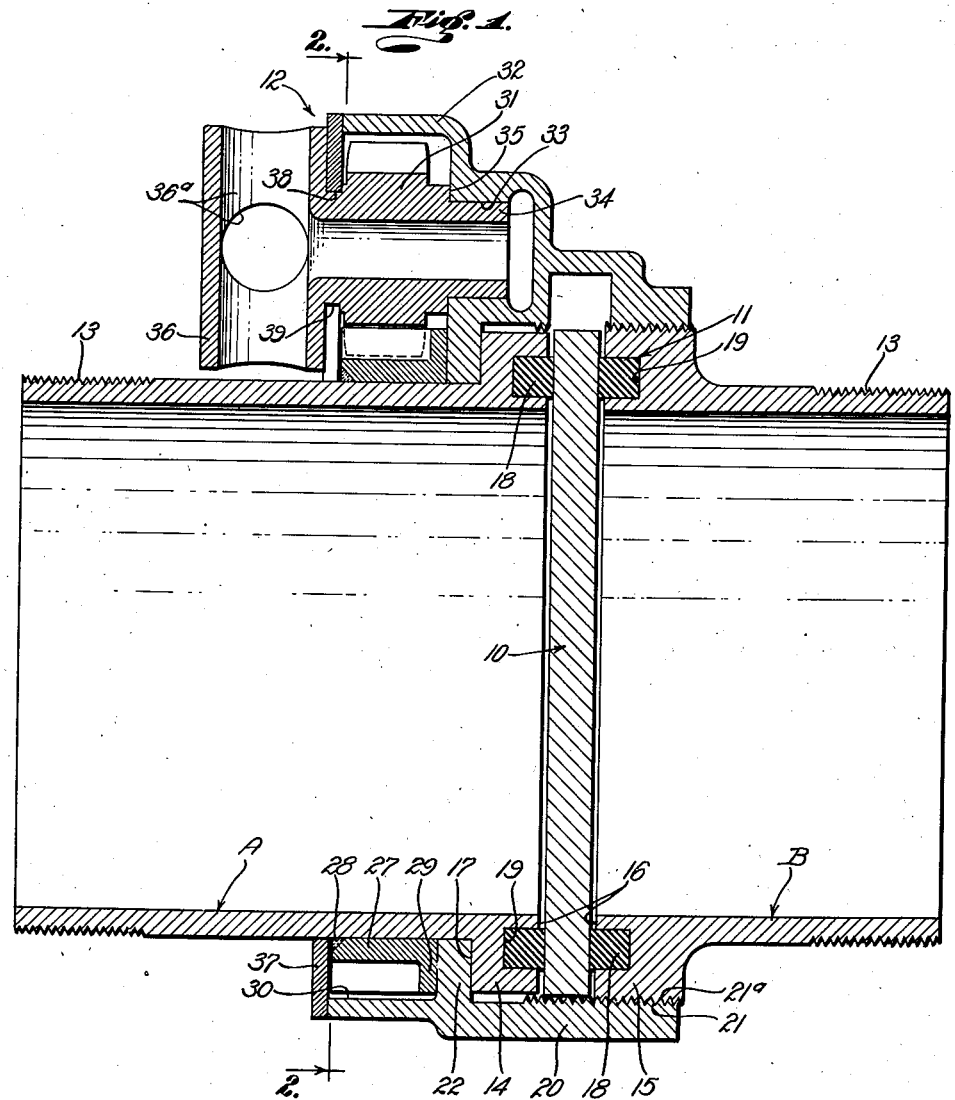
Inventor
Leland S. Hamer
By
His Attorney

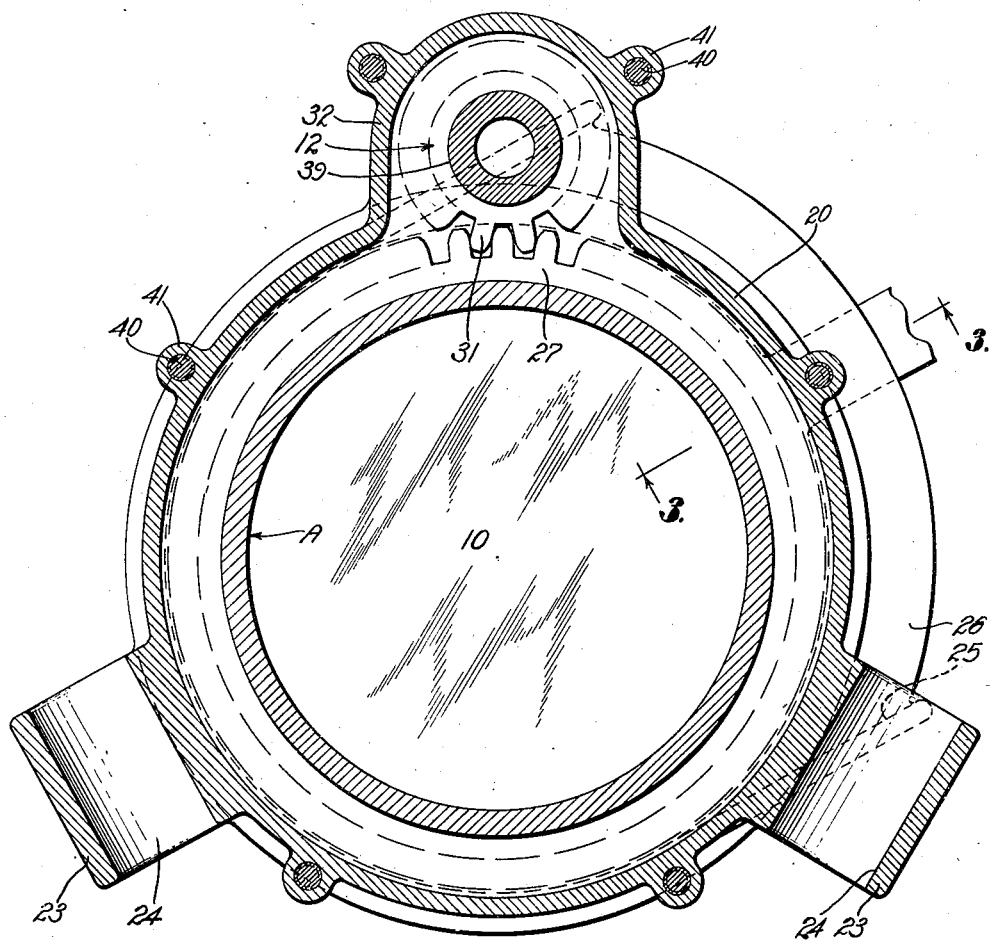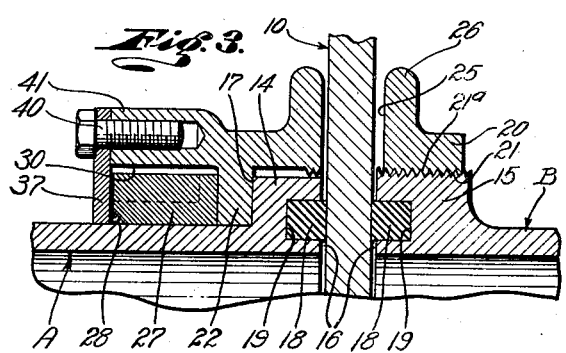

Patented Apr. 7, 1942

2,278,848

UNITED STATES PATENT OFFICE 2,278,848

LINE BLIND

Leland S. Hamer, Long Beach, Calif., assignor of one-fourth to Paul A. Dewhirst, Los Angeles, Calif.

Application December 20, 1939, Serial No. 310,184

9 Claims. (Cl. 251—167)

This invention relates to fluid handling equipment and relates more particularly to a line blind for installation in a pipe line or the like. A general object of this invention is to provide a practical, inexpensive and easily operated line blind.

Line blinds are installed in pipe lines, etc. at points where it may be desired to cut off the flow to permit the repair and replacement of valves and other equipment. The usual line blind comprises a pair of flanges connected in the line and a plate to be inserted between the flanges. It is a laborious time-consuming operation to spread the flanges for the insertion of the plate and the fluid from the line leaks away when the plate is being installed. This often results in a substantial loss of fluid and where the fluid is inflammable a dangerous fire hazard is created.

Another object of this invention is to provide a line blind in which the plate may be easily and quickly installed and removed.

Another object of this invention is to provide a line blind that may be readily operated by one person to tightly clamp the plate in place or to free the plate for removal.

Another object of this invention is to provide a line blind embodying a simple, yet very effective gear operated means for spreading the fitting sections and for moving the sections together to clamp against the plate.

Another object of this invention is to provide a line blind of the character mentioned in which the sections may be quickly moved toward and away from one another by manually rotating a sleeve member without resorting to the use of the gear means, and may be forcibly moved toward one another to bring their packing rings into tighter sealing cooperation with the plate by operation of the gear means following the initial manual rotation of the sleeve member.

A further object of this invention is to provide a line blind of the character mentioned that is small and compact and readily installed in a pipe line, or the like.

The various objects and features of my invention will be fully understood from the following detailed description of a typical preferred form and application of the invention, throughout which description reference is made to the accompanying drawings, in which:

Fig. 1 is a central longitudinal detailed sectional view of the line blind of the invention showing the packing means in sealing engagement with the plate. Fig. 2 is a transverse detailed sectional view taken as indicated by line 2—2 on Fig. 1, and Fig. 3 is an enlarged fragmentary detailed sectional view taken as indicated by line 3—3 on Fig. 2.

The improved line blind of the present invention may be said to comprise, generally, two sections A and B to be connected in a pipe line, a plate 10 arranged between the sections A and B, packing means 11 on the sections A and B for sealing with the plate 10, and means 12 for moving the sections A and B toward and away from one another to pack with and free the plate 10.

The sections A and B are elongate tubular elements arranged in end to end relation and related for relative longitudinal movement. Means are provided at the outer ends of the sections A and B to facilitate the connection of the device in a pipe line or the like. In the construction illustrated the outer portions of the sections A and B have external threads 13 for cooperating with couplings or other threaded pipe parts, it being understood that the sections A and B may be otherwise conditioned for connection in the line. The inner end of the section A is provided with an external annular flange 14 and a similar flange 15 is provided on the inner end of the section B. The ends of the flanges 14 and 15 are flush with the inner ends of the sections A and B so that the sections present large opposing end surfaces 16. The outer end 17 of the flange 14 is preferably flat and normal to the longitudinal axis of the device.

The plate 10 is adapted to form a closure for the fluid passage through the device and is intended to be arranged between the opposing surfaces 16. The plate 10 may be a flat sided part having an imperforate portion to fully close the line and having an end portion provided with an opening for registering with the passage through the device, this construction being typical of line blind plates. The plate 10 is removable and is adapted to be turned end for end between the position where it fully closes off the flow and the position where it permits a free flow of fluid.

The packing means 11 are carried by the sections A and B to seal with the opposite sides of the plate 10. The means 11 comprise rings 18 formed of a resilient packing material that is resistant to or unaffected by the fluid handled. The rings 18 are set or secured in annular grooves 19 in the end surfaces 16 of the sections A and B. The packing rings 18 project from the surfaces 16 to contact and seal with the plate 10. The packing rings 18 sealing with the opposite surfaces of the plate 10 positively prevent the leakage of fluid around the plate.

The means 12 for moving the sections A and B toward and away from one another is a feature of the invention. The means 12 is such that it may be quickly directly manually operated to move the sections A and B toward one another so that the packing rings 18 are brought against the plate 10 and then operated through gearing to urge the packing rings 18 against the plate 10 with great force to assure tight positive seals. In the preferred construction the means 12 includes a ring or sleeve member 20 surrounding the flanges 14 and 15. The member 20 is a continuous annular or tubular element and is rotatable relative to the sections A and B. The rotatable sleeve member 20 has threaded engagement with one of the sections. In the case illustrated the member 20 has an internal thread 21 mating with an external thread 21ª on the flange 15 of the section B. An inturned annular lip 22 is provided on the member 20 and cooperates with the surface 17 of the flange 14 to hold the member 20 against longitudinal movement in one direction relative to the section A. The member 20 is held against longitudinal movement in the other direction as will be later described so that rotation of the member moves the sections A and B toward and away from one another.

Means is provided to facilitate easy rotation of the sleeve member 20. One or more ears or lugs 23 project from the periphery of the member 20 and have openings 24 for receiving a rod, bar, or the like, for turning the member. In the typical case illustrated in Fig. 2, there are two circumferentially spaced turning lugs 23. It will be seen that the member 20 may be easily and quickly rotated by engaging a suitable bar, or the like, in a lug 23. A lateral opening 25 is provided in the member 20 to admit the plate 10. The opening 25 communicates with the space between the surfaces 16 and is sufficiently large to freely pass the plate 10. Lips or rims 26 may be provided on the member 20 at the mouth of the opening 25 to strengthen the construction and to guide the plate 10 into and out of the opening.

The means 12 further includes gearing that provides a substantial mechanical advantage for moving the sections A and B relative to one another to finally tighten the rings 18 against the plate 10 and to free the packing rings from the plate. The gearing includes a ring gear 27 surrounding the sections A adjacent the lip 22. The ring gear 27 may be fixed to the section A by welding 28 or other appropriate securing means. A flange 29 on the inner end of the gear 27 is engaged by the lip 22 and serves to prevent outward movement of the member 20 on the section A. It will be observed that the lip 22 is received between the flange surface 17 and the gear flange 29 to hold the member 20 against axial movement in both directions relative to the section A. A substantially annular socket or recess 30 is provided in the end of the member 20 to receive the ring gear 27. The recess 30 receives the gear 27 with suitable clearance.

A pinion 31 is rotatably supported by the sleeve member 20 to mesh with the ring gear 27. The member 20 is provided with an outwardly projecting housing 32 for containing the pinion 31. The housing 32 may be an integral part of the member 20 and its interior is open to the recess 30. A socket or axial opening 33 is provided in the inner wall of the housing 32 to receive and rotatably support a trunnion or shaft 34 on the inner end of the pinion 31. A shoulder 35 on the pinion 31 cooperates with the inner wall of the housing 32 to hold the pinion against inward movement. The outer end of the pinion 31 is provided with means for facilitating the ready operation or rotation of the pinion. In the construction illustrated an enlargement or head 36 is formed on the outer end of the pinion 31 and has diametric openings 36ª for receiving a turning tool such as a bar or rod, or the like. The pinion head 36 is at the outer end of the sleeve member 20 where it is freely accessible.

A plate 37 is provided to close the outer ends of the recess 30 and housing 32. The plate 37 is an annular member surrounding the section A and engaged against the end of the member 20 to close the end of the recess 30. The plate 37 is shaped to extend across the mouth of the housing 32 and has a notch 38 for receiving the pinion 31 to facilitate the assembling of the pinion. A groove 39 is formed in the pinion 31 at the inner side of the head 36 to receive the adjacent portion of the plate 37 and the cooperation of the plate with the groove 39 holds the pinion against axial movement. Screws 40 passed through openings in the plate 37 and threaded into openings in spaced lugs 41 on the member 20 removably secure the plate to the member.

In using the line blind of the present invention the plate 10 may normally be positioned so that its perforate portion (not shown) is arranged between the sections A and B to allow a free flow of fluid through the device. The packing rings 18 normally engage against the plate 10 to provide seals at opposite sides of the plate preventing leakage of fluid. When it is desired to close off the line a bar or the like may be inserted in an opening 36ª and manipulated to rotate the pinion 31. The pinion 31 meshing with the gear 27 produces rotation of the member 20 and the mating threads 21 and 21ª move the sections A and B apart. In practice it may be necessary to rotate the pinion only a few times to free the packing rings 18 from the plate 10 and with the packing rings free of the plate a bar or the like may be inserted in an opening 24 to directly rotate the member 20. In other words, the packing rings 18 may be freed from the plate 10 by rotation of the pinion 31 and may then be retracted clear of the plate by direct rotation of the member 20. With the packing rings 18 retracted from the plate 10 the plate may be removed and turned end for end to bring its imperforate portion to the position between the surfaces 16. The member 20 is then rotated by engaging a suitable tool in a lug opening 24 and the member is turned until the packing rings 18 are brought against the opposite sides of the plate 10. In some instances rotation of the member 20 by a bar or the like engaged in an opening 24 may clamp the packing rings 18 against the plate 10 with sufficient force to prevent leakage. In other cases it may be preferred to complete the operation by rotating the pinion 31. Rotation of the pinion 31 tightly forces the packing rings 18 against the plate 10 to assure positive dependable seals that resist high fluid pressures. The insertion and removal of the line blind plate 10 may be quickly and easily accomplished and the gear means assures tight seals with the plate and makes it easy to free the plate where the packing tends to stick.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A device to be connected in a fluid handling line comprising two tubular sections to be connected in the line in end to end relation, the sections being related for relative longitudinal movement, a plate inserted between said ends of the sections, a rotatable member arranged around the sections, cooperating threads on one section and the member, a ring gear surrounding and secured to the other section, a pinion rotatably supported by the member to mesh with the gear, and means including the gear for holding the member against longitudinal movement relative to said other section whereby rotation of the member by operation of the pinion moves the packing into and out of sealing engagement with the plate.

2. A device to be connected in a fluid line comprising two tubular sections related for relative longitudinal movement and arranged in end to end relation, means at the outer ends of the sections for connecting the sections in the line, flanges on the inner ends of the sections, a ring gear secured to one section in spaced relation to its flange, a rotatable member around the sections having threaded cooperation with the flange of the other section, a part on the member received between the ring gear and the flange of the first named section holding the member against longitudinal movement relative to said first named section whereby rotation of the member causes movement of the members toward or away from one another, and a pinion on the member meshing with the gear for rotating the member.

3. A device to be connected in a fluid line comprising two tubular sections related for relative longitudinal movement and arranged in end to end relation, means at the outer ends of the sections for connecting the sections in the line, flanges on the inner ends of the sections, a ring gear secured to one section in spaced relation to its flange, a rotatable member around the sections having threaded cooperation with the flange of the other section, a part on the member received between the ring gear and the flange of the first named section holding the member against longitudinal movement relative to said first named section whereby rotation of the member causes movement of the members toward or away from one another, a housing on the member, a pinion rotatably supported in the housing and meshing with the gear, and an accessible operating part on the pinion at the exterior of the housing.

4. A device to be connected in a fluid line comprising two tubular sections related for relative longitudinal movement and arranged in end to end relation, means at the outer ends of the sections for connecting the sections in the line, flanges on the inner ends of the sections, a ring gear secured to one section in spaced relation to its flange, a rotatable member around the sections having threaded cooperation with the flange of the other section, a part on the member received between the ring gear and the flange of the first named section holding the member against longitudinal movement relative to said first named section whereby rotation of the member causes movement of the members toward or away from one another, the member having a recess receiving the ring gear, a housing on the member communicating with the recess, and a pinion rotatably supported in the housing to mesh with the gear operable to rotate the member.

5. A device to be connected in a fluid handling line comprising two tubular sections to be connected in the line in end to end relation, a plate inserted between the opposing ends of the sections, a rotatable member surrounding the opposing end portions of the sections and having a lateral opening to pass the plate, cooperating threads on the member and one section for causing relative longitudinal movement of the sections when the member is rotated, a gear fixed on the other section holding said member against longitudinal movement on said other section, and a rotatable pinion on the member meshing with the gear so rotation of the pinion causes rotation of the member relative to the sections.

6. A device to be connected in a fluid handling line comprising two tubular sections to be connected in the line in end to end relation, a plate inserted between the opposing ends of the sections, a rotatable member surrounding the opposing end portions of the sections and having a lateral opening to pass the plate, cooperating threads on the member and one section for causing relative longitudinal movement of the sections when the member is rotated, a gear fixed on the other section holding said member against longitudinal movement on said other section in one direction, a shoulder on the said other section holding said member against longitudinal movement on said other section in the other direction, and a rotatable pinion on the member meshing with the gear so rotation of the pinion causes rotation of the member relative to the sections.

7. A device to be connected in a fluid handling line comprising two tubular sections to be connected in the line in end to end relation, a plate inserted between the opposing ends of the sections for closing off the fluid flow through the sections, a rotatable member surrounding the opposing end portions of the sections and held against longitudinal movement relative to one section and having a lateral opening through which the plate may be introduced to assume the position between the ends of the sections, cooperating threads on the member and other section for causing relative longitudinal movement of the sections when the member is rotated, and gear means connecting the member and said one section for rotating the member relative to said one section.

8. A device to be connected in a fluid handling line comprising two tubular sections to be connected in the line in end to end relation, a plate inserted between the opposing ends of the sections for closing off the fluid flow through the sections, a rotatable member surrounding the opposing end portions of the sections, the member having a lateral opening through which the plate may be introduced to said position between the ends of the sections, means holding the member against longitudinal movement relative to one section, cooperating threads on the member and other section producing relative longitudinal movement of the sections upon rotation of the member, a projection on the member engageable to rotate the member to bring the opposing ends of the sections against the plate, and gear means for rotating the member to tighten the sections against the plate.

9. A device to be connected in a fluid handling line comprising two tubular sections to be connected in the line in end to end relation, a plate to be inserted between the opposing ends of the sections for closing off the fluid flow through the sections, a rotatable member surrounding the opposing end portions of the sections, the member having a lateral opening through which the plate may be introduced to said position between the ends of the sections, means holding the member against longitudinal movement relative to one section, cooperating threads on the member and other section producing relative longitudinal movement of the sections upon rotation of the member, a projection on the member engageable to rotate the member to bring the opposing ends of the sections against the plate, and gear means for rotating the member to tighten the sections against the plate, the gear means including a gear fixed to the first named section, and a pinion rotatably supported on the member and meshing with the gear.

LELAND S. HAMER.